April 15, 1930.  J. H. FOX ET AL  1,754,853
APPARATUS FOR MAKING COMPOSITE GLASS
Filed Aug. 1, 1928  6 Sheets-Sheet 1

INVENTORS
John H. Fox
Wm. Owen
by James C. Bradley
Atty

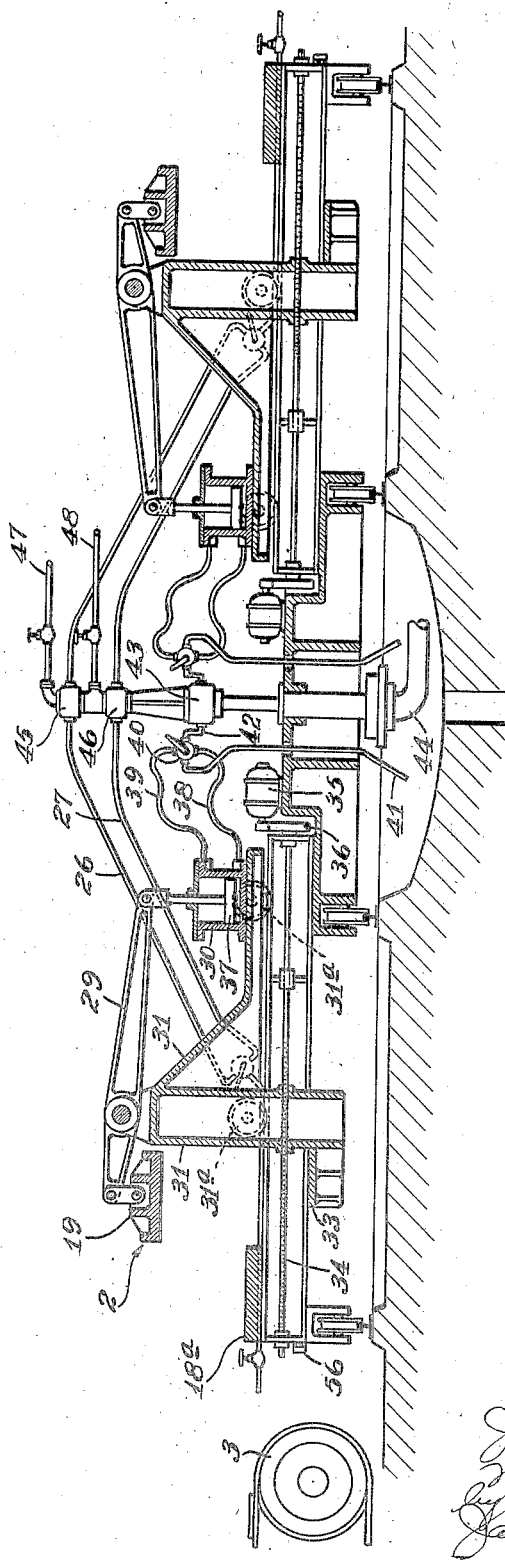

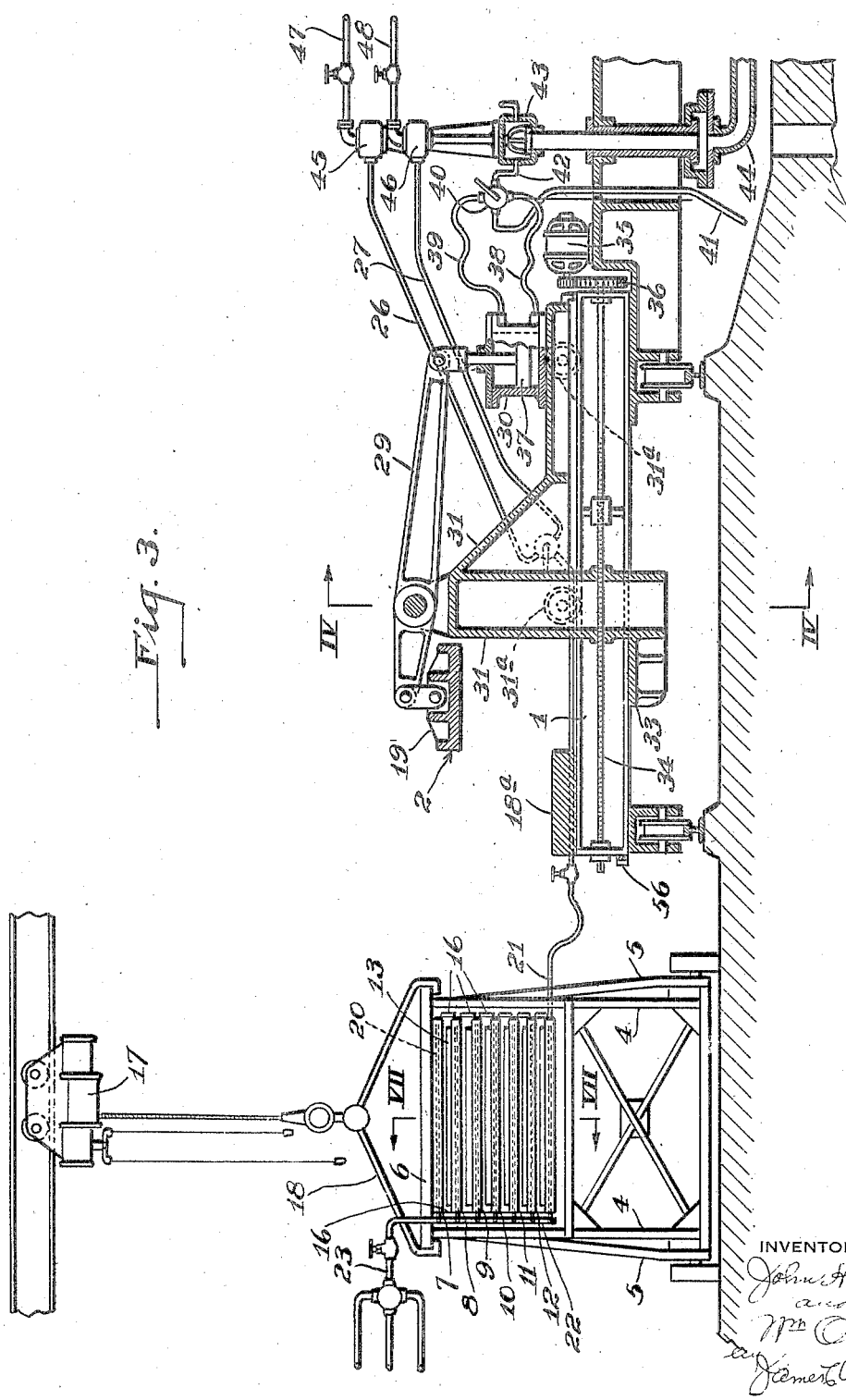

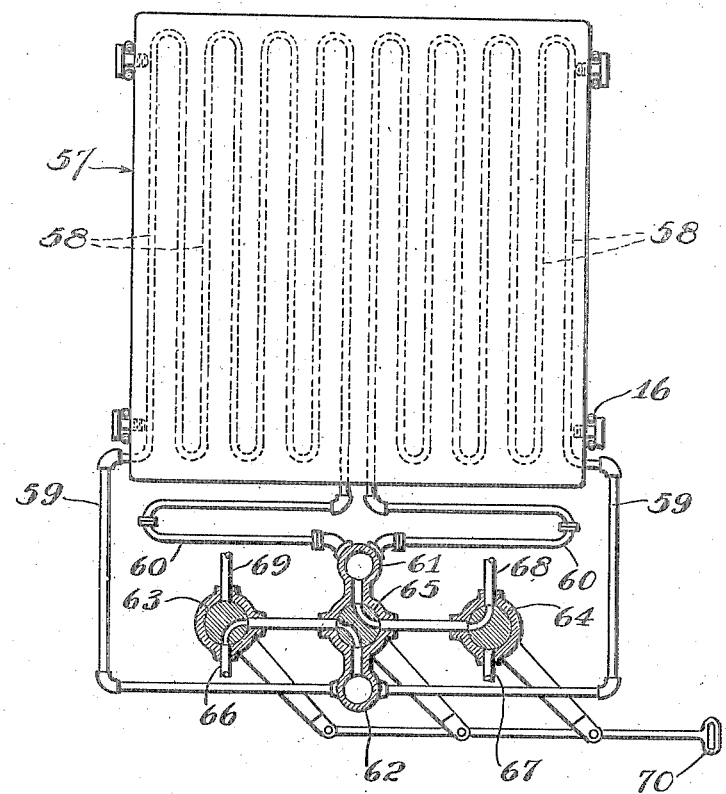
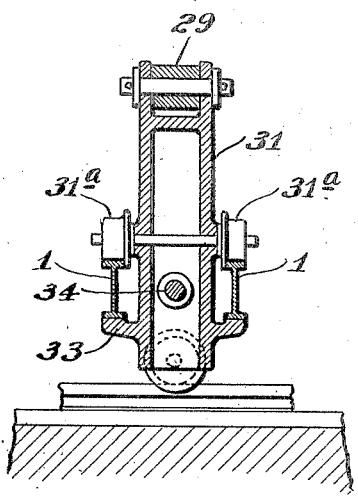

April 15, 1930.  J. H. FOX ET AL  1,754,853
APPARATUS FOR MAKING COMPOSITE GLASS
Filed Aug. 1, 1928  6 Sheets-Sheet 5

INVENTORS
John H. Fox
and
Wm Owen
by
James L. Bradley

Patented Apr. 15, 1930

1,754,853

UNITED STATES PATENT OFFICE

JOHN H. FOX AND WILLIAM OWEN, OF PITTSBURGH, PENNSYLVANIA, ASSIGNORS TO PITTSBURGH PLATE GLASS COMPANY, A CORPORATION OF PENNSYLVANIA

APPARATUS FOR MAKING COMPOSITE GLASS

Original application filed December 17, 1926, Serial No. 155,425. Divided and this application filed August 1, 1928. Serial No. 296,779.

Figure 1:
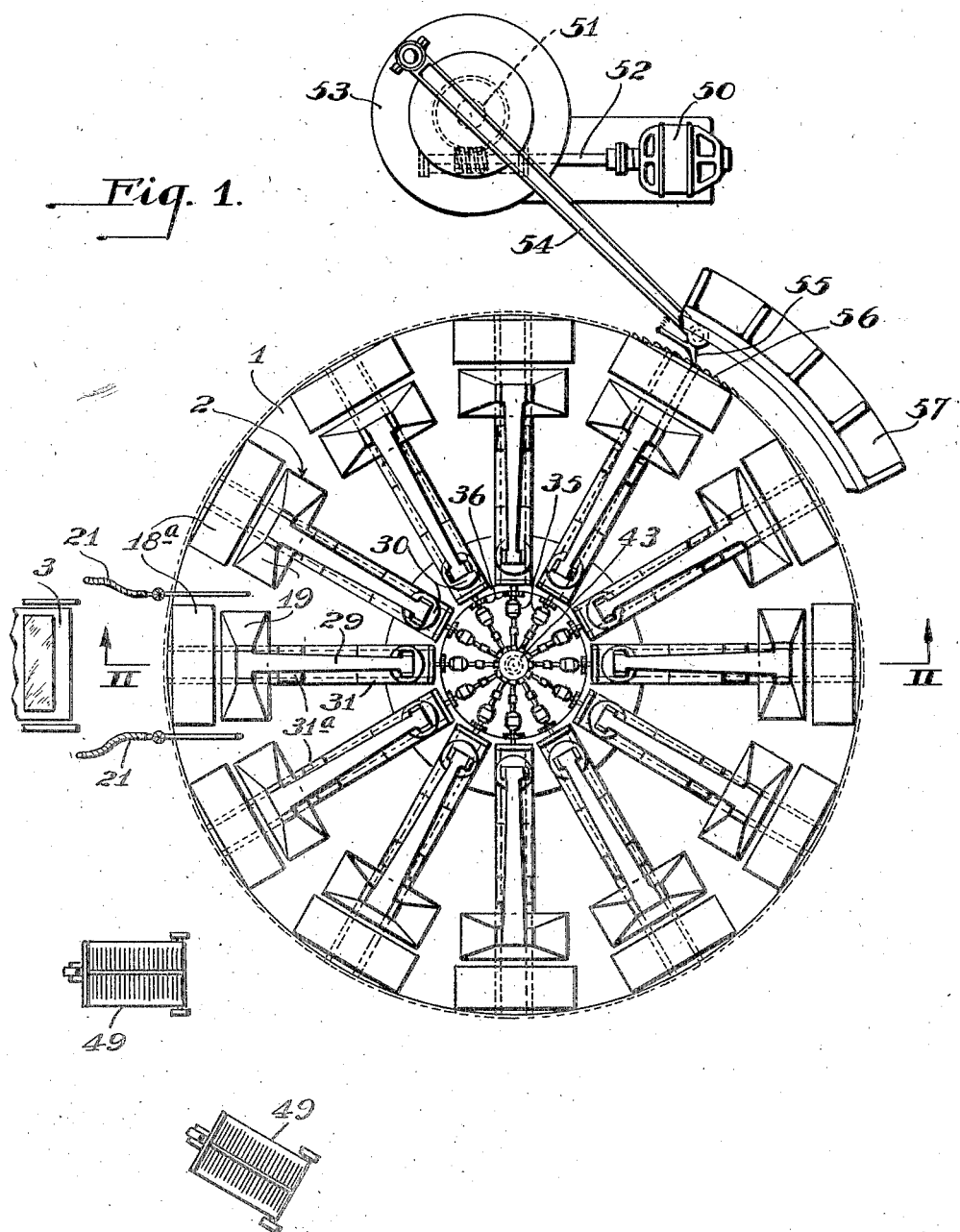
Figure 6:
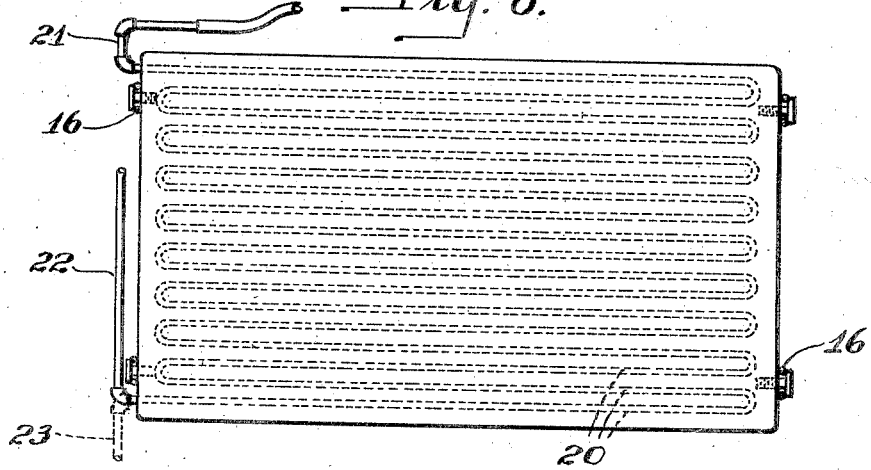
Figure 5:
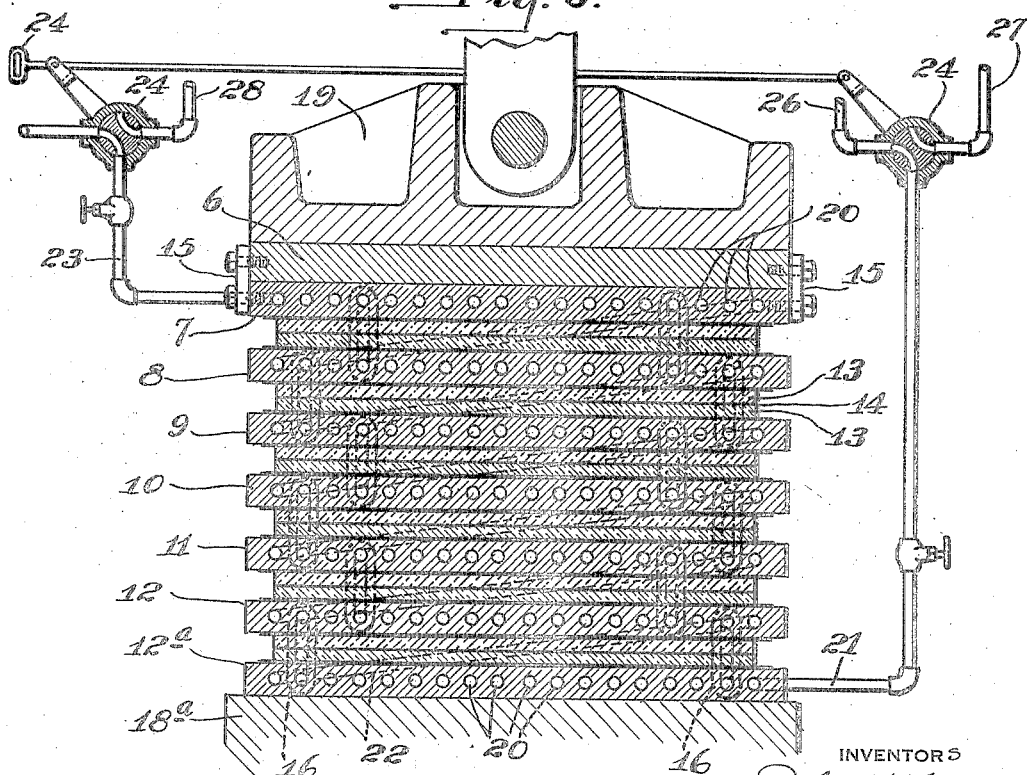
Figure 7:
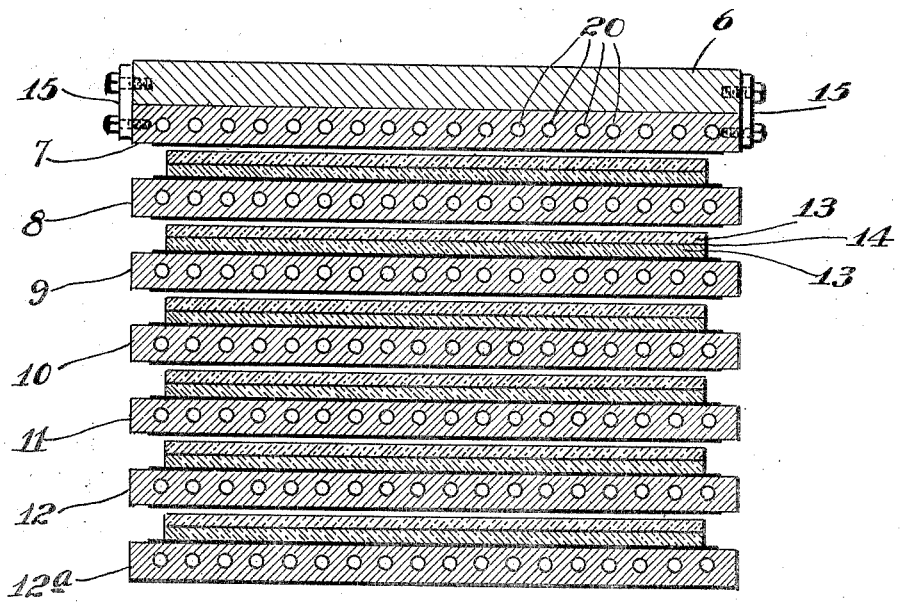
Figure 9:
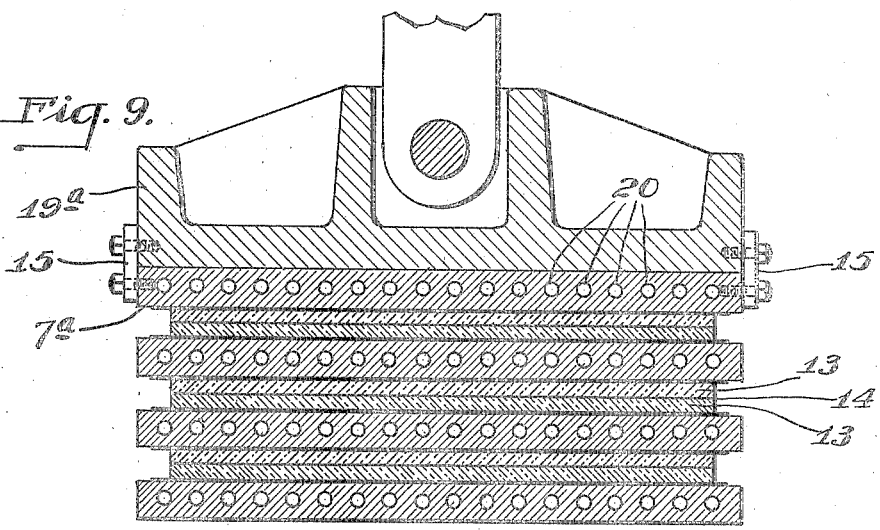

The invention relates to an apparatus for making composite glass, and particularly to the means for applying heat and pressure to cause the joinder between the glass and celluloid, and the present application constitutes a division of our application, Serial No. 155,425. Composite glass ordinarily comprises two sheets of glass with a sheet of celluloid cemented therebetween, although a greater or less number of layers of material may be employed. It is preferred to assemble the sheets with a coating of cement, such as gelatin dried upon the surfaces of the glass, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, and the invention may be employed in such way, if desired. The invention has for its primary objects the provision of a means whereby a plurality of composite plates may be formed simultaneously, and whereby quantity production may be secured with a limited number of operatives. One embodiment of the invention is illustrated in the accompanying drawings, wherein:

Figure 1 is a plan view of the apparatus. Fig. 2 is a transverse section on the line II—II of Fig. 1. Fig. 3 is a view similar to that of Fig. 2, but on an enlarged scale and showing only one-half of the apparatus. Fig. 4 is a section on the line IV—IV of Fig. 3. Fig. 5 is an enlarged section through one of the heating units. Fig. 6 is a plan view of one of the heating elements. Fig. 7 is an enlarged section on the line VII—VII of Fig. 3. Fig. 8 is a plan view showing a modification. And Fig. 9 is a section through another modification.

In carrying out the process, the sheets of glass and celluloid which are to be formed into composite plates are brought into position opposite the turntable 1 carrying the series of presses 2 on the endless carrier 3. These plates have been previously treated to prepare them for the pressing operation, such treatment involving the cleaning of the glass and celluloid plates and the application to one side of each of the glass sheets of a thin film of gelatin or other cement. This cement is of such a character that when a celluloid sheet is placed between two glass sheets and heat and pressure applied thereto, the cement will be softened and the sheets will be securely attached together when the composite plate thus formed has cooled off, it being desirable that this cooling off should occur while the sheets are maintained under pressure. If gelatin is used as a cement, the temperature ordinarily employed will be about 250 degrees F. and the pressure about 150 lbs. per square inch.

In order to make the operation a multiple one, to form a number of composite plates at the same time, the sheets are arranged in a stack with alternate heating elements, as indicated in Fig. 7, such assembling of the plates preferably being done upon one or more racks 4 placed adjacent the end of the carrier 3. The racks are provided with standards 5 at the sides adapted to support the plates 6 from which the heating elements are supported. As indicated in Fig. 5, the heating unit consists of the seven plates 7, 8, 9, 10, 11, 12 and 12ᵃ spaced apart so as to receive the sets of glass and celluloid sheets between them. Fig. 7 indicates the composite plates of glass and celluloid in position ready for the application of heat and pressure, 13, 13 being the glass sheets and 14 the celluloid sheets. The plate 6 is secured to the heating element by means of the connections 15 held in place by studs or bolts, and the other heating elements 8, 9, 10, 11 and 12 are supported by means of the links 16 engaging pins projecting from the ends of the elements. The entire pack of heating elements is in this manner supported from the plate 6 with the plates or elements separated to permit the insertion of the glass and celluloid sheets. At the same time, the loose connections permit the elements to move upward when the unit is placed in the press, as later described. After the glass and celluloid plates have been placed between the heating units, the unit may be lifted from the overhead crane 17 provided at its lower end with hook members 18, which fit around the projecting edges of the plate 6. The unit carrying the sheets to be secured together can now be placed upon one of the base members 18 of a press, the press head 19 being at such time moved inward, so that it is out of the way, the arrangement whereby this is accomplished being later described.

Each of the heating units or plates 7, 8, 9, etc. is cored out, as indicated in Fig. 6 to provide a passageway 20 for the application of a heating fluid, such as steam. A connection 21 (Figs. 3 and 5) is provided to the passageway 20 in the bottom element or plate 12$^a$ for supplying steam to such passageway, and the other end of such passageway is connected by means of the pipe 22 (Fig. 6) to the passageway 20 in the plate 12 lying above the plate 12$^a$. Similarly, the passageway 20 in the plate 12 is connected to the passageway 20 in the plate 11, all of the passageways in the series of plates being thus connected up so that a flow of steam from the inlet pipe 21 passes through the entire series of elements until it reaches the outlet pipe 23. The pipe 21 leads to a four-way valve 24, while the pipe 23 leads to the four-way valve 24$^a$, and a handle 25 is provided for operating both of the valve levers together. A steam connection 26 leads to the four-way valve 24 and also a water pipe 27. When the valve 24 is in the position shown, steam is conducted through the heating elements and out through the pipe 23, this being the condition which exists during the application of pressure to the heating unit. After the application of such pressure, it becomes desirable to cool off the unit as rapidly as possible, and this is accomplished by shifting the rod 25 to the right and operating the valve 24 through a rotation of 90 degrees to cut off the steam supply and connect the water pipe 27 with the pipe 21, the valve 24 being rotated at the same time to connect the pipe 23 with the water outlet pipe 28. A flow of water is thus secured through the unit so that it is cooled quickly, thus permitting the removal of the unit from the press after a relatively short period and making it comfortable for the operatives to handle the composite plates after the press is opened.

In order to get the presser head 19 out of the way so that the heating units with the sheets carried thereby may be positioned upon the base member 18 of the press, the head and its operating means are mounted so that they may be moved radially inward to the position indicated in Fig. 3. The parts are also moved to this position when it is desired to remove the heating unit after the pressing operation. In providing for this feature, the head 19 and its operating lever 29 and the cylinder 30 are carried upon a frame or standard 31 mounted for sliding radial movement inward and outward upon the wheels 31$^a$ (Fig. 4). The standard 31 is provided with a shoe 33 extending beneath the I-beams constituting the body of the turntable and such standard is moved in and out by means of the screw 34 swiveled in the framework of the turntable and driven from the motor 35 through the medium of suitable reducing gearing 36.

The power cylinder 30 carries a piston 37 for swinging the lever 29 and fluid pressure is provided for operating the plunger by means of the connections 38 and 39 controlled by the four-way valve 40. Leading from this four-way valve is a drain pipe 41 and a connection 42 leading to the header 43 placed centrally of the turntable, such header being supplied with fluid under pressure through the pipe 44. Steam and water are supplied to the pipes 26 and 27 from the headers 45 and 46 located centrally of the turntable, such headers being supplied from the pipes 47 and 48.

The turntable 1 preferably carries twelve presses, all similar to the one heretofore described and all having suitable connections to the central headers 43, 45 and 46. The turntable is given a step by step rotation so as to bring the presses successively past the loading point, and after the pressing operation is completed, the heating units are removed from the presses and the composite plates taken out and placed upon carrying trucks by which they are transported to the apparatus for rounding up the edges. Two of these trucks 49 are shown in Fig. 1. The units can then be reloaded and placed in the presses, as heretofore described. The valves for admitting steam and water to the heating units and for controlling the supply of fluid pressure to the press operating the cylinders, are shown and described as hand-operated, but the actuation of these valves, if desired, may be made automatic by the movement of the turntable, and suitable means for accomplishing this result being shown and described in a somewhat similar apparatus in my copending application, Serial No. 155,424. The turntable is given its step by step rotation by means of the apparatus shown in plan view in Fig. 1. This apparatus includes the motor 50, which drives the vertical shaft 51 through the intermediary of a worm on the motor shaft 52 and a worm wheel on the shaft 51. The shaft 51 carries a crank disc 53, to which is attached the connecting rod 54. The free end of this connecting rod is provided with a spring pressed dog 55 held in engagement with the rack 56 on the periphery of the turntable (Fig. 3) by means of the segmental guide 57.

In operation, the glass and celluloid sheets, arranged in sets of three (Fig. 7), are placed in the heating unit supported on the rack 4, as indicated in Fig. 3, after which the crane 17 lifts the unit and places it upon the presser block 18, the presser head at such time being in its inner position, as shown in Fig. 3, so that there is no interference with the crane. The motor 35 is then operated to move the frame 31 outward so that the presser head lies over the heating unit. The valve 40 is now operated to admit fluid beneath the plunger 37 of the presser cylinder, thus causing the head 19 to move down and apply the necessary pressure to the heating unit and the set of plates carried thereby. At the same time, the three-way valve 24 is operated to admit fluid under pressure through the pipe 21 to the perforated plates 7 to 12ª, the exhaust steam passing out through the pipe 23 (Fig. 5). After the steam has been applied to the heating plates long enough to soften the cement between the glass and celluloid, the valve rod 25 is shifted to cut off the steam supply and move the valve 24 so that water is supplied through the pipe 21 and through the heating plates, such water being exhausted through the pipe 28. This cooling flow of water is maintained until the composite plates cool down to a point at which they may be conveniently handled and pressure is maintained upon the plates during this cooling action, as the cementing action has been found to be more effective when the pressure is maintained upon the plates during the cooling action. This operation is repeated upon each of the twelve presses carried by the turntable and when the presses again arrive adjacent the loading point and the presser head 19 is raised, the motors 35 are operated to move the frame 31 back to the starting position shown in Fig. 3, at which time, the head 19 lies inward with respect to the heating unit. The crane 17 can now be brought into play to move the heating unit on to one of the stands 4, at which time the composite plates may be removed from the unit and placed upon one of the trucks 49.

In the construction heretofore described, the plates 7 to 12 of the heating unit have their passages all coupled together so that the steam supply from the pipe 21 passes through all of the plates in series. In some cases, it may be desirable to have a separate steam supply for each plate, as this will give a more rapid heating of the plates, and this arrangement is indicated in Fig. 8, wherein each plate 57 has two passages 58, 59, the pipes 60, 60 serving as the exhaust from the passages 58, 58. Vertical headers 61 and 62 supply steam and water to the four-way valves 63 and 64, such valves being arranged one above the other so that there is a pair of controlling valves opposite each plate. The valves 63 and 64 are supplied from a four-way valve 65 arranged as shown. The pipes 66 and 67 are the steam and water inlet pipes respectively, while the pipes 68 and 69 are the steam and water exhaust pipes. When the parts are in the position shown, the plate is being heated by steam from the pipe 66, the exhaust at such time passing out through the pipe 68. When the handle 70 is shifted to the left so as to turn the valves 90 degrees, the supply of steam past the valve 63 is cut off and the valve 64 is shifted so that water from the pipe 67 is admitted through the pipes 59, 59, the water after passing through the passages 58, 58, being exhausted through the pipe 69.

Fig. 9 illustrates a further modification, in which the top plate 7ª of the heater unit is bolted to the presser head plate 19ª. In this construction, the heater plates below the plates 7ª are suspended by means of links as in the construction heretofore described and heating fluid is supplied through such plates in the same manner as in the form of construction wherein the unit is made removable. In this form of construction, the units remain in the presses so that the loading occurs with the heating plates supported from the head 19ª, as shown. It is, therefore, not necessary to mount the presser head and operating parts for radial movement as is done in the construction of Fig. 3 thus simplifying the construction to a considerable extent. After the pressing operation, the presser heads 19ª are raised and the composite glass and celluloid plates removed and a new set of sheets inserted between the heating plates. In the use of both forms of apparatus, it is desirable to place sheets of paper or other suitable material between the faces of the heating elements and those of the glass sheets to avoid danger of scratching the glass.

What we claim is:

1. Apparatus for applying pressure to a plurality of sets of glass sheets with interposed layers of reinforcing material comprising a carrier mounted for movement, a plurality of presses mounted on the carrier and each consisting of a base in fixed position on the carrier, and a presser head and power means therefor mounted on the carrier for movement transversely of the base, so that in one position the head lies over the base and in another position it lies to one side of the base.

2. Apparatus for applying pressure to a plurality of sets of glass and reinforcing layers comprising, a turntable, and a plurality of presses mounted on the turntable, and each consisting of a base in fixed position adjacent the periphery of the table, and a presser head and power means therefor mounted for radial movement in and out, so that in its outer position, the head lies over the base and in its inner position, it lies to one side of the base.

3. Apparatus for applying pressure to a plurality of sets of glass and reinforcing layers comprising, a turntable, a plurality of presses mounted on the turntable and each consisting of a base in fixed position adjacent the edge of the turntable, and a presser head and power means therefor mounted for radial movement in and out, so that the head may be positioned either over said base or inward thereof, and means for moving said head and its power means in and out.

In testimony whereof, we have hereunto subscribed our names this 25th day of July, 1928.

JOHN H. FOX.
WILLIAM OWEN.